Oct. 22, 1940.   R. S. FULLER, JR   2,218,843
CRAB AND MINNOW TRAP
Filed Nov. 7, 1939   2 Sheets-Sheet 1
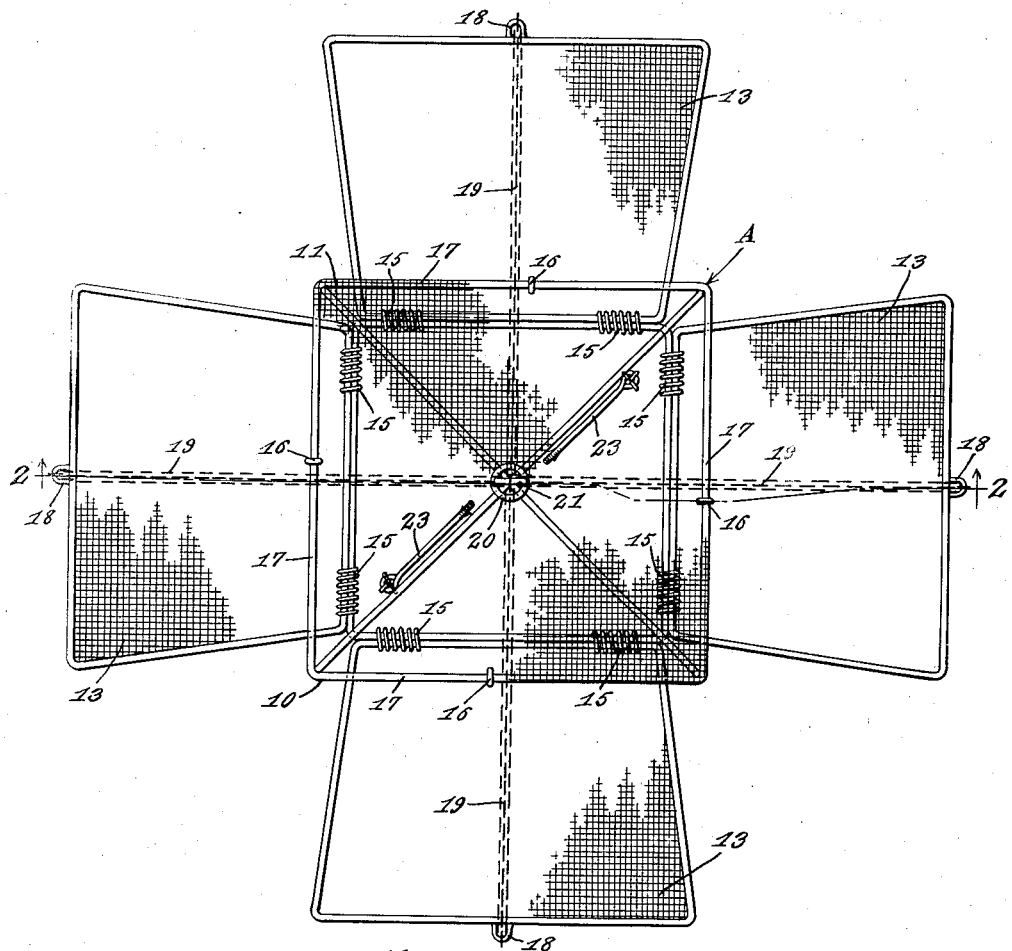
Richard S. Fuller Jr., INVENTOR
BY Victor J. Evans & Co.
ATTORNEYS Oct. 22, 1940.   R. S. FULLER, JR   2,218,843
CRAB AND MINNOW TRAP
Filed Nov. 7, 1939   2 Sheets-Sheet 2
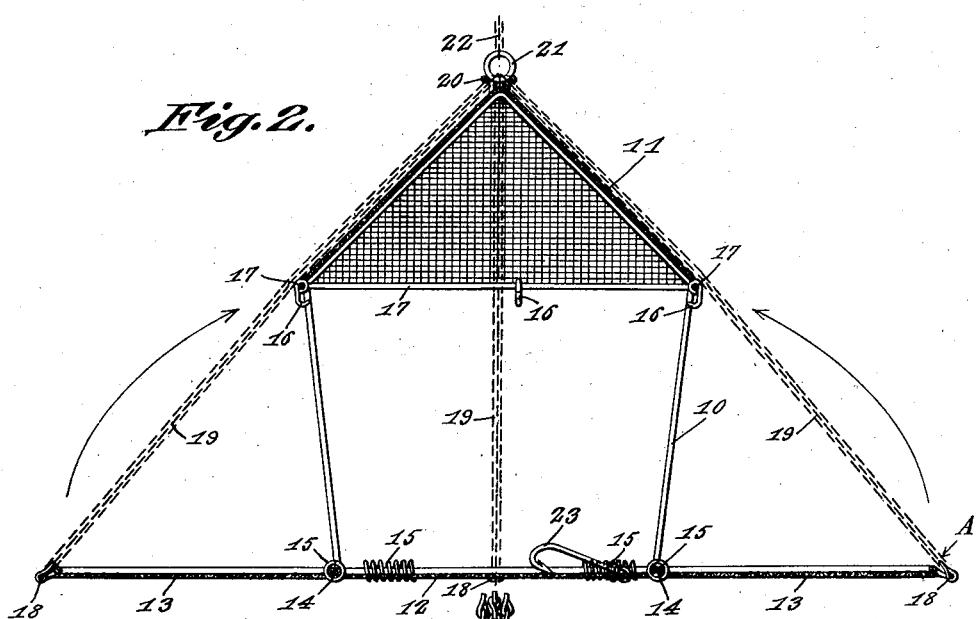
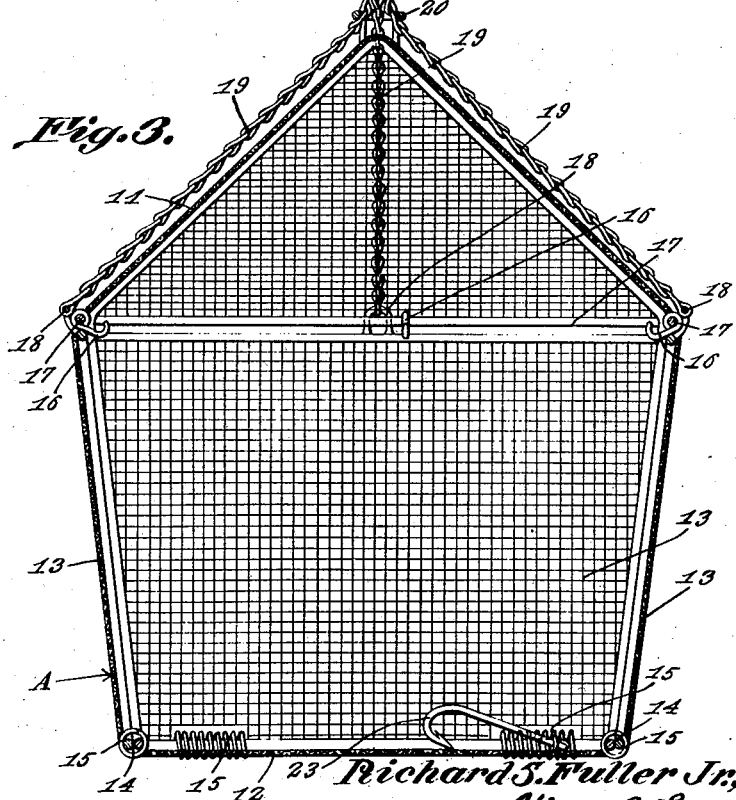

Patented Oct. 22, 1940

2,218,843

UNITED STATES PATENT OFFICE 2,218,843

CRAB AND MINNOW TRAP

Richard S. Fuller, Jr., Monahans, Tex.

Application November 7, 1939, Serial No. 303,289

1 Claim. (Cl. 43—105)

The invention relates to a trap and more especially to a non-collapsible box or trap for crabs and minnows.

The primary object of the invention is the provision of a trap of this character wherein the side walls thereof when in an open position can be closed for trapping purposes, the closing being had from a casting line, chain or cable and within the said trap bait can be stored, the trap being especially designed for trapping crabs and minnows and also will function as a live box.

Another object of the invention is the provision of a trap of this character wherein the opening and closing sides thereof can be latched in a closed position and these sides under the tension of springs will automatically swing to an open position when unlatched.

A further object of the invention is the provision of a trap of this character, which is simple in construction, thoroughly reliable and efficient in operation, convenient for easy handling, strong, durable, and inexpensive to manufacture.

With these and other objects in view, the invention consists in the features of construction, combination and arrangement of parts as will be hereinafter more fully described in detail, illustrated in the accompanying drawings, which disclose the preferred embodiment of the invention and pointed out in the claim hereunto appended.

In the accompanying drawings:

Figure 1 is a plan view of the trap constructed in accordance with the invention showing the sides in open position.

Figure 2 is a sectional view take on the line 2—2 of Figure 1 looking in the direction of the arrows.

Figure 3 is a vertical sectional view through the trap with the sides in closed position.

Figure 4 is an enlarged fragmentary vertical sectional view showing in detail one of the latches employed with the device.

Similar reference characters indicate corresponding parts throughout the several views in the drawings.

Referring to the drawings in detail, A designates generally the trap constructed in accordance with the invention which comprises a rigid main body frame 10, preferably made from wire having the required rigidity and strength, and this body frame is formed with an upwardly tapered reticulated crown 11 and a reticulated flat bottom 12, respectively, the frame being preferably four-sided and susceptible of being opened at the four sides thereof. The open sides of the frame 10 are adapted to be closed by reticulated side sections 13, being hinged at 14 for swinging movement to opened or closed positions. Each side 13 has associated therewith springs 15 of the coiled type which function to swing the companion sections thereto to an opened position.

The side sections when closed are fastened in this position by hook-like latches 16, these being rotatably hung on upper side rails or bars 17 of the said frame 10. The latches 16 are manually released to allow the side sections 13 to move to open position under the tension of the springs 15.

Engaged with the latching edges of the side sections 13 to eyes 18 formed thereon are pull chains 19, these being trained through a guide 20 fixedly mounted at the peak of the crown 11 and these chains are joined with a grouping ring 21 carried by a hoisting chain 22. The chain 22 operates the chains 19 so that the side sections 13 will swing to closing position from open position as shown in Figure 2 to the closed position shown in Figure 3 of the drawings. These side sections 13 when in closing position can be latched by the latches 16 hereinbefore set forth. Arranged within the frame 10 and attached to the bottom are bait hooks 23 for bait.

The trap is designed particularly as a crab or minnow trap and can be used as a live box for service to fishermen.

The springs 15 of the coiled type create the hinges 14 for the side sections 13 in that the latter are swingingly joined with the frame 10 by such springs.

The ring 21 coacts with the guide 20 as a stop to limit the opening movement of the side sections 13, which, when in open position, lie substantially in the same plane with the flat bottom 12 of the body frame 10. These side sections 13 when swung upwardly to closing position do not become automatically latched by the latches 16 as the latter have to be manually operated for latching purposes, the said latches being kicked out of the way of the side sections 13 on the closing thereof, as is shown in Figure 3 of the drawings, and the weight of the body frame counter to the lifting of the trap and the resistance of the springs 15 does not interfere with the closing movement of the side sections 13 on the bodily lifting of the trap by the hoisting chain 22.

What is claimed is:

A trap of the kind described comprising a body frame having an upwardly tapered permanent crown and a permanent flat bottom, swingable side sections connected with the frame and movable for the opening and closing thereof, springs active on the side sections for moving the same to open position, pull members connected with the side sections for the closing thereof, a guide at the crown and having the pull members trained therethrough, and a hoist member connected with said pull members and having means limiting the movement of the said pull members in one direction for cooperation with the guide.

RICHARD S. FULLER, Jr.